United States Patent [19]

Matsumoto

[11] Patent Number: 5,761,367
[45] Date of Patent: Jun. 2, 1998

[54] COATED OPTICAL DEVICES AND METHODS OF MAKING THE SAME

[75] Inventor: Roger Lee Ken Matsumoto, Newark, Del.

[73] Assignee: Lanxide Technology Company, LP, Newark, Del.

[21] Appl. No.: 696,412

[22] Filed: Aug. 13, 1996

[51] Int. Cl.$^6$ .............................. G02B 6/02; B05D 5/06
[52] U.S. Cl. .................. 385/128; 385/126; 385/127; 385/141; 427/163.2
[58] Field of Search .................. 385/126, 127, 385/128, 141, 142, 143, 144, 145; 427/163.2, 167

[56] References Cited

U.S. PATENT DOCUMENTS

| | | | |
|---|---|---|---|
| 4,118,211 | 10/1978 | Au Coin et al. | 65/3 R |
| 4,689,252 | 8/1987 | Lebrun et al. | 427/228 |
| 4,929,704 | 5/1990 | Schwark | 528/28 |
| 5,001,090 | 3/1991 | Schwark | 501/97 |
| 5,017,717 | 5/1991 | Wright et al. | 556/413 |
| 5,021,533 | 6/1991 | Schwark | 501/97 |
| 5,032,649 | 7/1991 | Schwark | 528/21 |
| 5,155,181 | 10/1992 | Schwark | 525/474 |
| 5,199,098 | 3/1993 | Nolan et al. | 385/128 |
| 5,214,734 | 5/1993 | Inniss et al. | 385/128 |
| 5,246,734 | 9/1993 | Varaprath et al. | 427/166 |
| 5,298,291 | 3/1994 | Klinger et al. | 427/513 |
| 5,320,659 | 6/1994 | Ishiguro et al. | 65/312 |
| 5,616,650 | 4/1997 | Becker et al. | 525/102 |
| 5,637,641 | 6/1997 | Becker et al. | 525/102 |

FOREIGN PATENT DOCUMENTS

| | | | |
|---|---|---|---|
| 0 270 220 | 8/1988 | European Pat. Off. | 385/128 X |
| 5100102 A | of 0000 | Japan | 385/128 X |

*Primary Examiner*—Brian Healy

[57] ABSTRACT

The present invention relates to coated optical devices, such as optical fibers and optical wave guides, and methods for forming coated optical devices. Methods for forming coated optical devices comprise providing at least one optical device and contacting at least a portion of at least one optical device with at least one coating composition comprising at least one metal-nitrogen polymer. The at least one coating composition may further comprise at least one multifunctional organic electrophile comprising at least one monomer, oligomer, or polymer comprising a plurality of organic electrophilic substituents. The coating composition contacting at least a portion of an optical device is at least partially crosslinked, thereby forming coated optical devices which exhibit enhanced resistance to, for example, deterioration resulting from, among other things, exposure to chemicals and environmental factors.

23 Claims, No Drawings

COATED OPTICAL DEVICES AND METHODS OF MAKING THE SAME

BACKGROUND OF THE INVENTION

Optical fibers are widely used in communications systems because of their ability to carry large amounts of information over long distances. Information is transmitted through optical fibers by carrier waves of optical frequencies that are generated by sources such as lasers or light emitting diodes. Optical fibers are typically made of silica glass, although polymer clad silica fibers and polymer core fibers are known. In order to protect fibers from, for example, physical damage and from deterioration due to chemical and environmental factors, optical fibers are customarily coated with one or more protective layers.

The application of protective coatings on optical fibers provides insulation from stresses such as abrasion, fractures and corrosion, which can induce signal loss in telecommunications cables. For example, glass optical fibers are often coated with a polymeric coating for protection against abrasions and fractures. Fractures resulting from small external forces or transverse strains applied to an optical fiber, for example, while bending during manufacturing, installation and maintenance may be sufficient to cause lateral deformation and optical loss.

Additionally, environmental factors such as oxidation, moisture, high humidity, and temperature, can cause degradation of the fibers, particularly at sites where fractures and surface irregularities occur. Various chemicals, including water, can react with a fiber damaging its optical properties and weakening its mechanical strength; microcracks in fiber surfaces are especially susceptible to such chemical and water attack when a fiber is under stress. For example, it is known that water causes stress corrosion in glass, and further, it has been found recently that water can penetrate existing coatings and corrode glass fibers.

Therefore, coatings suitable for optical fibers must have protective qualities which provide, for example, a barrier from oxygen, moisture, and other chemical and environmental conditions, as well as a reduction of static fatigue and microbending loss. Further, such coatings should exhibit a combination of flexibility and toughness. Because of the difficulty in obtaining all of the desired protective properties in a single coating, an optical fiber is frequently provided with at least two coating materials. The two or more coatings may typically comprise a soft polymeric coating to protect the fiber from, for example, mechanical stress, and a harder coating to provide for example, toughness, abrasion resistance, and general ease of handling.

For efficient manufacturing and economic production, conventional coating materials may include those which can be rapidly applied to and cured on the surface of the optical fiber. A preferred coating technique typically includes "in-line" coating where the fiber is coated after it is drawn but before being taken up on a winding drum. Preferred coating materials for rapid optical fiber production include coating formulations which can be cured, for example, by radiation such as ultraviolet (UV), and thermal means.

Conventionally, optical fibers are coated with an organic coating material. Typical organic coating materials may include, for example, UV-curable polymer coating materials including radiation-curable polyurethane or polyurethane-polyurea acrylate materials. In U.S. Pat. No. 5,199,098, Nolan et al. teach moisture-resistant, UV-curable acrylate resin coated optical fibers wherein the coating compositions comprise a phosphite stabilizing agent in combination with an acrylate terminated polyurethane oligomer wherein the urethane groups are the reaction product of an aliphatic isocyanate and a predominantly saturated, predominantly nonpolar aliphatic diol. Other common organic materials which provide barriers against, for example, oxygen permeation include polymer based resins such as ethylene vinyl alcohol and polyvinylidene chloride. Such materials, however, may be inefficient under extreme conditions such as high humidity and may therefore be unsuitable for many applications.

Another class of coating materials for use in providing protection to optical fibers includes carbon coatings. For example, U.S. Pat. No. 5,320,659, issued in the name of Ishiguro et al., describes a method for coating the surface of an optical fiber with carbon comprising the steps of introducing an optical fiber in a reaction chamber in the same direction as the flow of a coating raw material which comprises carbon, hydrogen and halogen atoms. Carbon is deposited on the surface of the optical fiber by the chemical vapor deposition of the raw material.

Many organic coating materials, however, suffer inherent deficiencies because, for example, they cannot prevent diffusion of water vapor or hydroxyl ions to the optical fiber which may create or increase microstructural defects on the surface of the fiber and, thus, decrease the strength of the fiber.

A further class of coating materials for use on optical fibers includes inorganic hermetic coatings. Inorganic hermetic coatings may be typically formed, for example, from silicon-based materials, such as silica and silicones, or other inorganic materials such as metals, and are applied by techniques such as chemical vapor deposition and other comparable techniques. In general, non-polymeric inorganic coating materials, such as silicon-based materials, are highly desirable for optical fiber applications compared to organic polymer coating materials, because silicon-based materials provide excellent protection from moisture and chemical corrosion as well as dynamic fatigue. Additionally, silicon-based coatings generally tend to have a sufficiently different refractive index than the optical fiber core, thus favorably preventing light which escapes from the core from re-entering the fiber. Accordingly, protective silicon-based coating materials have been used on light conducting devices, including optical fibers, wave guides, light pipes, or cables.

For example, in U.S. Pat. No. 4,118,211, Au Coin et al. teach a method for forming a ceramic coating on the surface of an optical fiber for protection from both moisture and chemically corrosive environments. The coated fiber was formed by depositing a 0.02 to 0.20 micrometer layer of silicon nitride on a freshly drawn fused silica fiber by a chemical vapor deposition method using ammonia, silane, and nitrogen as a carrier gas, with temperatures ranging from 600° C. to 1000° C. However, it has been found that such ceramic coatings are often permeable to hydrogen which may cause a deterioration of the transmission signal.

U.S. Pat. No. 5,214,734, issued in the name of Inniss, et al. teaches incorporating particulate material such as silica in a polymeric jacket to enclose an optical fiber wherein the particulate material is at least partially soluable in water, such that, for example, a water and silica solution can be formed which has reduced reactivity toward the optical fiber relative to pure water to delay the expected onset of accelerated fiber fatigue. Optical fibers coated with the UV-curable liquid prepolymer jacket are believed to be protective against water because as water permeates a silicafilled jacket layer, silica is leached from the jacket and enters solution, and the permeating water which reaches the optical fiber is saturated, or nearly saturated, with silica, thereby reducing the propensity of the water for attacking the glass of the optical fiber.

Further, U.S. Pat. No. 5,246,734, issued in the name of Varaprath et al., describes the formation of a unilayer amorphous silicon hermetic coating on light conducting devices, including optical fibers, wave guides, light pipes, or cables, comprising thermally decomposing in a reaction chamber halosilanes or halodisilanes in the vapor phase in the presence of the optical wave guide and a metal catalyst. An amorphous silicon is thereby hermetically coated onto the optical wave guide.

U.S. Pat. No. 5,298,291, issued in the name of Klinger et al. teaches the formation of optical fibers coated with infinite network fluoro-polymers such as, for example, silicone amine $C_0$–$C_6$ fluoroepoxy resin and cis-trans fluoropolyol polyacrylate for protection against moisture and abrasion resistance. These flouro-polymeric coatings taught by Klinger et al. may be UV-cured or thermally cured.

Conventional methods for coating objects with silicon-based materials may possess inherent problems relating to, among other things, deposition techniques which include, for example, chemical vapor deposition. Problems inherent in such coating techniques may include, for example, lack of uniformity or reproducibility, less efficient manufacturing, and complex or expensive set-ups. Moreover, the compositions of the conventional silicon-containing materials may not be sufficient barriers against, for example, hydrogen.

Accordingly, there has been a long-felt need for simple and reliable coatings and application techniques for such coatings which provide, among other things, protection from adverse physical and environmental conditions which can lead to deterioration of the optical fiber and subsequent failure or reduced efficiency.

The present invention is directed to the use of certain novel, inorganic polymer compositions which are well suited to overcome the deficiencies of conventional coating materials currently used for optical fibers. Such inorganic polymers have advantageous properties, such as excellent moisture and chemical resistance, providing increased corrosion resistance. Additionally, the liquid or fusible inorganic polymer compositions of the present invention exhibit excellent wetting when applied to the glass fiber and are capable of permeating and coating the surfaces of microstructural flaws to prevent further deterioration at these sites. Further, these novel inorganic polymer compositions may be applied efficiently during manufacturing of the optical fiber and without the need for complex set-ups.

DESCRIPTION OF COMMONLY OWNED PATENTS AND PATENT APPLICATIONS

The subject matter of this application is related to that of several commonly owned, copending applications and several commonly owned patents. Particularly, these patents and applications describe, among other things, novel inorganic and inorganic/organic polymer compositions and methods of making the same (hereinafter sometimes referred to as "Commonly Owned Inorganic/Organic Polymer Patent and Patent Applications"). The entire disclosures of all of the Commonly Owned Inorganic/Organic Polymer Patents and Patent Applications are expressly incorporated herein by reference in their entirety.

Commonly Owned U.S. Pat. No. 4,929,704, in the name of Schwark, is directed to among other things, the preparation of polysilazane addition polymers which are prepared by the reaction of ammonia with one or more halogenated silicon compounds to produce cyclic silazane ammonlysis products, and then further reacting a metal-nitrogen polymer comprising a silazane ammonolysis product with 0.1% to 30% by weight of an isocyanate, isothiocyanate, ketene, thioketene, carbodiimide, or carbon disulfide. Polysilazane addition polymers containing alkenyl or alkynyl groups can be cured by supplying energy to generate free radicals. This patent further describes a method for preparing polysilazane addition polymers in which the viscosity of the polymers can be controlled. The viscosity of such polymers may be tailored to be suitable for a specific intended end use. For example, high viscosities may be desirable for making fibers, and low viscosities may be desirable for polymers used to infiltrate porous ceramic bodies or produce thin films. U.S. Pat. No. 5,001,090, also in the name of Schwark and which issued from a divisional application of U.S. Pat. No. 4,929,704, relates to, among other things, silicon nitride ceramics which are produced by the pyrolysis of cured or uncured polysilazane addition polymers.

Further, Commonly Owned U.S. Pat. No. 5,021,533, issued in the name of Schwark, teaches poly(thio) ureasilazane compositions prepared by the reaction of an organic isocyanate with a polysilazane comprising Si-H bonds so as to effect a reaction of the isocyanate with the silicon-nitrogen bond of the polysilazane to create a composition in which the viscosity may be controlled, and which can be subsequently followed by a crosslinking reaction. Such crosslinking can be partially initiated by raising the temperature to not greater than 300° C. for a time sufficient to increase the viscosity to a value suitable for the desired end use of the polymer. Cured or uncured poly(thio) ureasilazanes can be pyrolyzed to yield a silicon-nitride containing ceramic material. Moreover, U.S. Pat. No. 5,032, 649, and U.S. Pat. No. 5,155,181, both issued in the name of Schwark, disclose the preparation of organic amide-modified silazane polymers by the initial reaction of, for example, less than about 30 wt % of an organic amide with a polysilazane comprising Si-H bonds so as to effect reaction of the isocyanate with the silicon-nitrogen bond followed by a crosslinking reaction in which the by-product is hydrogen gas.

Commonly Owned U.S. patent application Serial No. 08/223,294, filed Apr. 5, 1994 (PCT Publication No. WO 95/12630), which issued as U.S. Pat. No. 5,616,650, on Apr. 1, 1977, and which was a continuation-in-part application of U.S. patent application Ser. No. 08/148,044, filed Nov. 5, 1993, both in the names of Becker et al., is directed to, among other things, compositions which comprise uncrosslinked reaction mixtures comprising at least one organic monomer, oligomer, or polymer comprising a multiplicity of organic, electrophilic substituents, and at least one metal-containing polymer comprising a metal-nitrogen polymer. Further, compositions comprise reaction mixtures comprising at least one organic monomer, oligomer, or polymer comprising a multiplicity of organic, electrophilic substituents, and at least one of (a) silicon-nitrogen polymers, (b) aluminum-nitrogen polymers, (c) boron-nitrogen polymers and (d) polymer combinations thereof, which comprise a multiplicity of sequentially bonded repeat units, the compositions comprising the reaction products of the reaction mixtures, and the compositions obtained by crosslinking the reaction products of the reaction mixtures. Crosslinking may be effected through at least one of thermal-based, radiation-based free radical-based or ionic-based crosslinking mechanisms. The compositions may be molded or shaped by various techniques into numerous useful articles. Furthermore, the compositions may be applied as coatings by various techniques onto numerous articles to enhance the performance of such articles.

SUMMARY OF THE INVENTION

The present invention relates to coated optical devices, such as optical fibers and optical wave guides, for protection against, among other things, microstructural defects and deterioration resulting from, for example, chemical exposure and environmental factors including gasses, high temperature, humidity and moisture. Particularly, the present invention is directed toward coatings for optical devices comprising at least one metal-nitrogen containing composition and the resulting coated optical devices.

In one embodiment of the present invention, at least a portion of an optical fiber is coated with at least one composition which comprises at least one metal-nitrogen component comprising at least one monomer, oligomer, or polymer. Metals suitable for the at least one metal-nitrogen component of the at least one coating composition include metallic compounds, such as aluminum, and metalloids, such as boron and silicon, all of which are herein defined as metals for the purpose of the present invention. In a further embodiment of the present invention, the coating composition comprising at least one metal-nitrogen component further comprises at least one organic electrophile. The at least one organic electrophile comprises at least one monomer, oligomer, or polymer comprising a plurality of organic electrophilic substituents. In a preferred embodiment of the present invention, the coating compositions comprise silicon-nitrogen polymers which further comprise sites of organounsaturation such as alkenyl or alkynyl groups. Such compositions may then be cured in a subsequent step to a rigid solid by crosslinking after application onto at least a portion of the optical fiber.

The optical devices of the present invention may be coated with the novel protective coating compositions by any manner known in the art. In one method of the present invention, at least one protective coating may be applied to an optical fiber as the fiber is drawn from the molten fiber preform. In a preferred embodiment of the present invention, the fiber is passed through a liquid coating composition immediately upon being drawn. In a further preferred embodiment wherein the optical fibers possess latent heat from the drawing process, the compositions of the present invention may be partially crosslinked or cured upon contact with the freshly drawn fibers.

Coating compositions of the present invention may exhibit excellent wetting when applied to the optical fibers, and are capable of permeating and coating the surface of microstructural defects to prevent any further deterioration at these sites. Thus, optical fibers coated with such compositions exhibit enhanced resistance to deterioration resulting from, among other things, exposure to chemicals and environmental factors.

DETAILED DESCRIPTION OF THE INVENTION

The present invention relates to coated optical devices, such as optical fibers and optical wave guides, for protection against, among other things, microstructural defects and deterioration resulting from, for example, chemical exposure and environmental factors including gasses, high temperature, humidity and moisture. Particularly, the present invention is directed toward coatings for optical devices comprising at least one metal-nitrogen containing composition and the resulting coated optical device. It should be understood that the term optical device generally encompasses, for example, optical fibers and optical wave guides; however, the term optical fiber shall be used herein for convenience, and it should be understood to refer to all optical devices.

In one embodiment of the present invention, at least a portion of an optical fiber is coated with at least one composition which comprises at least one metal-nitrogen component comprising at least one monomer, oligomer, or polymer. Metals suitable for the at least one metal-nitrogen component of the at least one coating composition include metals, such as aluminum, and metalloids, such as boron and silicon, all of which are herein defined as metals for the purposes of the present invention. In a further embodiment of the present invention, the coating composition comprising at least one metal-nitrogen component further comprises at least one organic electrophile. The at least one organic electrophile comprises at least one monomer, oligomer, or polymer comprising a plurality of organic electrophilic substituents.

In a preferred embodiment of the present invention, at least a portion of an optical fiber is coated with one or more coating compositions derived from compositions comprising (1) at least one organic electrophile comprising at least one organic monomer, oligomer, or polymer comprising a plurality of organic, electrophilic substituents, and (2) at least one metal-nitrogen polymer comprising at least one of: (i) at least one metal-nitrogen polymer comprising at least one of silicon-nitrogen polymers, aluminum-nitrogen polymers, and boron-nitrogen polymers comprising a plurality of sequentially bonded repeat units (a), (b) and (c) recited below:

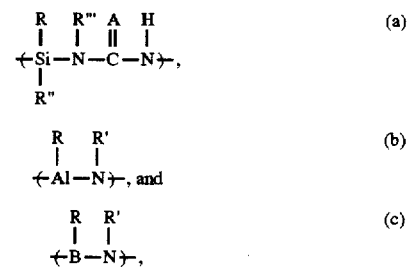

respectively, where R, R', R", and R'" hydrogen, alkyl, alkenyl, alkynyl or aryl and A=O or S; (ii) mixtures of two or more metal-nitrogen polymers comprising two or more of the structural units (a), (b), (c) and (d), recited below:

(iii) metal-crosslinked metal-nitrogen polymers comprising one or more of the structural units (a), (b), (c) and (d); and (iv) metal-nitrogen copolymers comprising two or more of the structural units (a), (b), (c) and (d).

In a further preferred embodiment, the coating compositions may react to form liquid, uncrosslinked hybrid polymer, or ceramer, compositions which incorporate at least one organic electrophile comprising the at least one organic monomer, oligomer, or polymer into the structure of the one or more metal-nitrogen containing polymers and which, in a subsequent step, may be cured to a rigid solid by crosslinking after application onto at least a portion of an optical fiber. In another preferred embodiment, the hybrid polymer, or ceramer, reaction product contacting at least a portion of the optical fiber comprises sites of organounsaturation such as alkenyl or alkynyl groups. Thus, where R=alkenyl or alkynyl groups, these reaction product compositions may then be cured.

Curing may be accomplished by supplying an energy input in the form of, for example, thermal energy or radiation, such as ultraviolet radiation, microwave radiation, laser or gamma radiation, or electron beam radiation to crosslink to a desired extent, the hybrid polymer, or ceramer, coating compositions. Crosslinking may occur, for example, where R=alkenyl or alkynyl groups, by activating alkenyl or alkynyl-based polymerization of the alkenyl or alkynyl groups within these compositions.

While many metal-nitrogen polymers may be suitable as coating compositions for the present invention, in a particularly preferred embodiment of the present invention alkenyl-substituted silicon-nitrogen polymers are particularly preferred. Preferred silicon-nitrogen polymers suitable for the practice of this invention comprise the repeat units (a) and (d), as defined above, where R=alkenyl and R'=H, and R", R'" and A are defined as above.

In one embodiment of the present invention wherein the silicon-nitrogen polymer comprises the repeat unit (d) as defined above, a coating composition may be prepared, for example, by reacting ammonia, or a mixture of ammonia and a substituted or unsubstituted 1–4 carbon alkyl or aryl amine, with at least one halogenated silicon compound selected from the group consisting of $RSiX_3$, $RR'SiX_2$ and mixtures thereof, including mixtures where more than one compound having the formula $RSiX_3$ or $RR'SiX_2$ may be used. Silicon-nitrogen polymers formed by such techniques may also sometimes be referred to as an 'ammonolysis product' or a 'silazane ammonolysis product'. Optionally, $RR'R"SiX$, $SiX_4$, or mixtures thereof, can also be present. In the present invention, X may comprise a halogen including, for example, Cl, Br, and I; and R, R' and R" may be the same or different and are selected from the group consisting of H, substituted or unsubstituted 1–6 carbon alkyl, aryl, 2–6 carbon alkenyl and 2-6 carbon alkynyl groups. Optionally, at least one halogenated silicon compound may comprise a Si-H bond. Examples of halogenated silicon compounds suitable for the practice of this invention include, but are not limited to, methyidichlorosilane, vinyl methyldich lorosi lane, tetrachlorosi lane, tetrabromosi lane, trichlorosi lane, vinyltrichlorosi lane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyidibromosilane, trimethylchlorosilane, dimethylchlorosilane, dimethylvinylchlorosilane, and trimethylbromosilane.

In a further embodiment of the present invention wherein the silicon-nitrogen polymer comprises repeat unit (a) as defined above, the silicon-nitrogen polymer may be prepared, for example, by first preparing the silicon-nitrogen polymer as described above or by any other suitable means, and then further reacting the silicon-nitrogen polymer with preferably from about 0.1% to 90%, based on the weight of the silicon- nitrogen polymer, of an organic electrophile comprising a multiplicity of electrophilic substituents. In a preferred embodiment, silicon-nitrogen polymers comprising repeat unit (d), as defined above, may be reacted with organic electrophiles including, for example, isocyanates, isothiocyanates, ketenes, thioketenes, carbodiimides, amides, imides, ketones, epoxides, esters, quinones, organic acids, carbon disulfide, in the formation of a silicon-nitrogen polymer comprising the repeat unit (a) as defined above.

In another preferred embodiment, coating compositions comprising silicon- nitrogen polymers comprising at least one of repeat units (a) and (d), as defined above, may further comprise alkenyl or alkynyl groups, and in an even more preferred embodiment, may further comprise vinyl groups. In another preferred embodiment, coating compositions comprising silicon-nitrogen polymers comprising at least one of repeat units (a) and (d) may be prepared from halogenated silicon compounds comprising methyldichlorosilane and vinylmethyidichlorosilane.

Low molecular weight, liquid silicon-nitrogen polymers are preferred in the present invention since co-reactant organic monomers, oligomers, or polymers which may be used in the present invention may often be miscible with, or soluble in, liquid silicon-nitrogen polymers, and the resulting mixture may be processed without the use of a solvent vehicle. Preferably, the silicon-nitrogen polymers used have a number average molecular weight ($M_n$) of less than about 5,000 and, more preferably, less than about 2,000. Narrow molecular weight distributions ($M_w/M_n$<about 3.0) are preferred. Typically, it is preferable to include such polymers at greater than about 10 wt % of the combined weight of the composition comprising the at least one metal- containing polymer and the at least one organic electrophile.

Organic electrophilic substituents which may be used in the practice of the present invention for reaction with the metal-nitrogen components comprising at least one member selected from the group consisting of repeat units (a), (b), (c), and (d), as defined above, contain a plurality of one or more reactive groups which may attack the electron density of the metal-nitrogen bond (e.g., Si-N bonds, Al-N bonds, B-N bonds, etc.), resulting in the breaking of these bonds and, subsequently, the formation of new bonds. Alternatively, when R'=H, the at least one organic electrophile comprising organic monomers, oligomers, or polymers may preferentially, but not necessarily exclusively, react at the N-H bonds of the metal-nitrogen polymer. Either mechanism provides for the incorporation of the at least one organic electrophile comprising at least one organic monomer, oligomer or polymer into the structure of the at least one metal-nitrogen polymer. In a preferred embodiment of the invention, such organic electrophiles may comprise liquids in order to increase the probability for reaction of the at least one organic electrophile comprising at least one organic monomer, oligomer or polymer with the one or more metal-nitrogen polymers.

Examples of typical electrophilic groups which are suitable electrophilic substituents for the multifunctional electrophile include groups containing, for example, the following bonding schemes:

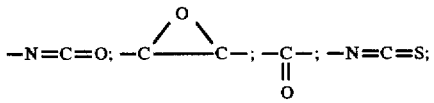

Typical examples of the at least one organic electrophile comprising organic monomers, oligomers or polymers suitable for the practice of this invention include, for example, multifunctional organic isocyanates, multifunctional compounds comprising amide linkages such as polyamides, multifunctional compounds comprising imide linkages such as polyimides, multifunctional epoxides, multifunctional compounds comprising ester linkages, such as polyacrylates, polycarbonates, polyvinylacetates, or polyesters, or multifunctional esters such as dimethyl adiptate. multifunctional ketones such as poly ether ketone and poly ether ether ketone. quinones (which can undergo sequential 1,4 addition reactions) and multifunctional organic acids such as polyacrylic acid.

While not essential for the purposes of the present invention, it may be desirable that the at least one organic electrophile comprising at least one organic monomer, oligomer, or polymer comprise about 0.1 wt % or more of the combined weight of the at least one organic electrophile and the at least one metal-containing polymer (e.g., the metal-nitrogen polymer). More preferably, the at least one organic monomer, oligomer, or polymer may comprise about 30 wt % or more, and most preferably between about 35 wt % and about 90 wt %.

In a preferred embodiment of the present invention, wherein the coating composition comprises an organic electrophile, the at least one organic electrophile comprising a monomer, oligomer or polymer comprises an isocyanate or an isothiocyanate. Isocyanates or isothiocyanates suitable for the practice of this invention may be polyfunctional substituted or unsubstituted 1–6 carbon alkyl, aryl, 2–6 carbon alkenyl or 2–6 carbon alkynyl compounds, and aryl compounds are preferred. For example, suitable monomeric, oligomeric, or polymeric organic isocyanates which may be used according to the present invention include, but are not limited to, aliphatic, cycloaliphatic, araliphatic, aromatic, heterocyclic polyisocyanates and mixtures thereof. It is generally preferred to use commercially readily available polyisocyanates, e.g. tolylene-2,4- and -2,6-diisocyanate and any mixtures of these isomers, polyphenyl-polymethylene-isocyanates obtained by anilineformaldehyde condensation, followed by phosgenation, and polyisocyanates which contain carbodiimide groups, urethane groups, allophanate groups, isocyanurate groups, urea groups, imide groups or biuret groups.

The reaction of a metal-nitrogen polymer with the above-mentioned multifunctional isocyanate monomers, oligomers, or polymers for the formation of coating compositions may proceed with or without a catalyst. Preferred catalysts may comprise, for example, organic tin compounds, bases which contain nitrogen, alkali metal hydroxides, alkali metal phenolates, alkali metal alcoholates, hexahydrotriazines, and silaamines with carbon-silicon bonds. Other catalysts may include tertiary amines and tertiary amine reaction products with alkylene oxides. Catalysts generally may be used in an amount of about 0.001% to about 100% by weight, based on the quantity of isocyanate, and optionally may be added simultaneously with the other components.

Coating compositions of the present invention may be formed with or without a solvent, as a suspension or as an emulsion. In a preferred embodiment of this invention, the reaction may be performed using liquid components and without the use of a solvent.

The coating compositions of the present invention may be cured by a number of different methods, depending on, for example, the specific coating utilized, the manner in which the coating is applied to the fiber, etc. For example, in one embodiment of the present invention, a coating composition comprising a silicon-nitrogen polymer comprising repeat unit (d) in which no organic electrophile has been reacted may be rapidly crosslinked upon contacting an optical fiber by, for example, exposure to an energy source such as thermal energy or radiation energy. In a preferred embodiment, the crosslinkable coating composition may comprise a vinyl-substituted silicon-nitrogen polymer comprising repeat unit (d). In a further preferred embodiment, the coating composition comprising a silicon-nitrogen polymer comprising repeat unit (d) further comprises a free radical generator to initiate crosslinking.

In another embodiment of the present invention, wherein an organic electrophile is added for reaction with the metal-nitrogen component, by selecting a multifunctional organic electrophile of the appropriate activity, the heat generated from the reaction of the at least one organic electrophile with a silicon-nitrogen polymer comprising R=vinyl to form an uncrosslinked hybrid polymer or ceramer may cause spontaneous crosslinking of the vinyl groups within the co-reacted composition. A very hard, rigid object may thus be obtained in a very short amount of time merely by admixing, for example, a liquid diisocyanate and a low molecular weight, liquid, vinyl-substituted polysilazane or polyureasilazane at about room temperature. Self-initiated crosslinking may be especially effective when a free radical generator, such as, for example, a peroxide or an azo compound, is added to the reaction mixture, so that the heat generated in the reaction of the organic electrophile with the silicon-nitrogen polymer initiates decomposition of the free radical generator to provide a high concentration of free radicals. In the absence of a large heat of reaction, radiation or thermal energy from an external source may be provided.

Suitable free radical generators may include, but are not limited to, organic and inorganic peroxides, alkali metal persulfates, ammonium persulfate, redox systems, aliphatic azo compounds, organic and inorganic peroxides with organic and inorganic metal compounds. For example, a suitable peroxide initiator may comprise dicumyl peroxide. Any suitable commonly known redox systems known to those who are skilled in the art may be used. Alternatively, other initiator systems may be used, such as peroxides with metal compounds as activators and benzoyl peroxide with a tertiary amine activator.

In a preferred embodiment of the present invention, the optical fiber is coated with a composition wherein the at least one metal-nitrogen polymer comprises silicon-nitrogen polymers, such as a polysilazane, polyureasilazane, or poly(thio)ureasilazane. The silicon-nitrogen polymers suitable for the practice of this invention may also comprise cyclic oligomers and ring-based and linear polymers. Low molecular weight, liquid silicon-nitrogen polymers are particularly preferred, and exhibit excellent wetting of the fiber substrate.

In another preferred embodiment of the present invention, optical fibers are coated with a liquid poly(thio)ureasilazane polymer composition wherein the viscosity of the liquid polymer composition is sufficiently low to allow permeation of the polymer into any mictostructural defects which may be present on the optical fiber and wetting of the internal surfaces of such defects. Such liquid polymer compositions may be formed, for example, where the at least one metal-nitrogen polymer comprises a silicon-nitrogen polymer comprising at least one of repeat units (a) and (d) as defined above. In another particularly preferred embodiment, the coating composition comprising a liquid silicon-nitrogen polymer comprising repeat units (a) and (d), further comprises at least one organic electrophile comprising, for example, an isocyanate and an isothiocyanate. Moreover, the liquid coating compositions of this invention may further contain a suitable free radical generator, such as a peroxide or an azo compound, in an amount effective to crosslink the polymer. In a particularly preferred embodiment wherein the liquid silicon-nitrogen polymer comprises a poly(thio)ureasilazane, the free radical generator comprises dicumyl peroxide.

Although not wishing to be bound by theory, it is believed that when the coating compositions of the present invention comprise liquid poly(thio)ureasilazanes, the coated optical fibers of the present invention exhibit enhanced resistance to deterioration by preventing water penetration. It is believed that water may be prevented from penetrating the coating where metal-nitrogen bonds react with water, and subsequently create metal-oxygen bonds. It is further believed that the coating compositions may substantially coat microstructural defects and bind hydroxyl groups to inhibit further deterioration.

Optical fibers coated with compositions according to the present invention may be coated in any manner known in the art. Conventionally, at least one protective coating is applied to freshly drawn fibers as an integral part of the production process. Thus, in the method of the present invention, the at least one protective coating may be applied as the fiber is drawn from the molten preform. In a preferred embodiment of the present invention wherein the coating composition is a liquid poly(thio)ureasilazane, the fiber is passed through the liquid polymer immediately upon being drawn. In a further preferred embodiment wherein optical fibers possess latent heat from the drawing process, the compositions of the present invention may be partially crosslinked or cured upon contact with the freshly drawn fiber. In another embodiment of the present invention wherein the coated fiber is remains uncrosslinked or only partially crosslinked, the coating material may be further crosslinked or cured by maintaining the fiber at an elevated temperature or by further exposing the coated fiber to at least one energy source such as a thermal energy source or radiation, for example, ultraviolet radiation, for a time sufficient to further crosslink the polymer.

The coated optical fibers of the present invention may be further coated with at least one additional protective composition. For example, when an optical fiber is coated with a coating composition comprising a poly(thio)ureasilazane, at least one additional coating composition such as, for example, an organic polymer, may be applied to the fiber to enhance, for example, the cushioning of the fiber. In a further embodiment of the present invention wherein the optical fiber is coated with a poly(thio)ureasilazane, the coating may be pyrolyzed to a ceramic and subsequently recoated with the same or a different poly(thio)ureasilazane which may be at least partially crosslinked. The coated optical fiber of this invention may additionally be coated with another coating material, such as one typically used in conventional optical fiber coating.

The coating compositions of the present invention may further contain at least one additional component which may further enhance the protection provided to the optical fiber by the at least one coating. For example, at least one of carbon, metal, ceramic, inorganic and organic polymeric materials may be incorporated as filler materials within such coatings.

While the preceding embodiments have been described with particularity, various modifications should be considered within the scope of the claims appended hereto.

What is claimed is:

1. A method for forming a coated optical fiber comprising the steps of:
   (1) drawing at least one optical fiber from a molten preform, wherein said at least one optical fiber comprises latent heat from said drawing step;
   (2) providing in contact with at least a portion of said at least one optical fiber at least one coating composition comprising at least one metal-nitrogen polymer; and
   (3) at least partially thermally crosslinking said at least one metal-nitrogen polymer upon contact with said at least one optical fiber, thereby forming said coated optical fiber.

2. The method of claim 1, wherein said at least one metal-nitrogen polymer comprises at least one metal selected from the group consisting of silicon, boron, and aluminum.

3. The method of claim 2, wherein said at least one metal-nitrogen polymer comprises at least one silicon-nitrogen polymer.

4. The method of claim 3, wherein said at least one silicon-nitrogen polymer comprises a liquid silicon-nitrogen polymer.

5. The method of claim 1, wherein said coating composition further comprises at least one multifunctional organic electrophile.

6. The method of claim 5, wherein said at least one multifunctional organic electrophile comprises at least one organic electrophile selected from the group consisting of isocyanates, isothiocyanates, amides, imides, ketones, organic acids, epoxides, esters, and quinones.

7. The method of claim 1, further comprising substantially completely crosslinking said at least one coating composition.

8. The method of claim 7, wherein said substantially completely crosslinking comprises further exposing at least a portion of said at least one coating composition to at least one energy source selected from the group consisting of thermal energy and radiation.

9. A method for forming a coated optical device comprising the steps of:
   (1) providing at least one optical device;
   (2) providing in contact with at least a portion of said at least one optical device at least one coating composition comprising a polysilazane formed by a reaction between ammonia and at least one halogenated silicon compound selected from the group consisting of $RSiX_3$, $RR'SiX_2$ and mixtures thereof, wherein X is selected from the group consisting of Cl, Br, and I; and R and R' are the same or different and are selected from the group consisting of H, substituted or unsubstituted 1–6 carbon alkyl, aryl, 2–6 carbon alkenyl and 2–6 carbon alkynyl groups, wherein no organic electrophile has been reacted with said polysilazane; and
   (3) at least partially crosslinking said polysilazane, thereby forming said coated optical device.

10. The method of claim 9, wherein said halogenated silicon compound further comprises at least one compound selected from the group consisting of RR'R"SiX and $SiX_4$, where R" has the same meaning as R and R'.

11. The method of claim 9, wherein at least one group of R and R' is a 2–6 carbon alkenyl or alkynyl group.

12. The method of claim 9, wherein said halogenated silicon compound further comprises at least one Si-H bond.

13. The method of claim 9, further comprising substantially completely crosslinking said at least one coating composition.

14. The method of claim 9, wherein said crosslinking comprises exposing at least a portion of said at least one composition to at least one energy source selected from the group consisting of thermal energy and radiation.

15. The method of claim 9, wherein said coating composition further comprises at least one additional component selected from the group consisting of carbon, metal, ceramic, inorganic polymeric material, and organic polymeric material.

16. A method for forming a coated optical fiber comprising the steps of:

(1) drawing at least one optical fiber from a molten preform, wherein said at least one optical fiber comprises latent heat from said drawing step;

(2) providing in contact with at least a portion of said at least one optical fiber at least one coating composition formed by reacting (a) at least one silicon nitrogen polymer, formed by a reaction between ammonia with at least one halogenated silicon compound selected from the group consisting of $RSiX_3$, $RR'SiX_2$ and mixtures thereof, wherein X is selected from the group consisting of Cl, Br, and I; and R and R' are the same or different and are selected from the group consisting of H, substituted or unsubstituted 1–6 carbon alkyl, aryl, 2–6 carbon alkenyl and 2–6 carbon alkynyl groups; and (b) from about 0.1% to about 90% by weight, based on the weight of said at least one silicon-nitrogen polymer, of at least one multifunctional organic electrophile selected from the group consisting of isocyanates, isothiocyanates, amides, imides, ketones, organic acids, epoxides, esters, and quinones; and (3) at least partially thermally crosslinking said at least one coating composition upon contact with said at least one optical fiber, thereby forming said coated optical fiber.

17. The method of claim 16, wherein said halogenated silicon compound further comprises at least one Si-H bond.

18. The method of claim 16, further comprising substantially completely crosslinking said at least one coating composition.

19. The method of claim 18, wherein said substantially completely crosslinking comprises further exposing at least a portion of said at least one composition to at least one energy source selected from the group consisting of thermal energy and radiation.

20. A coated optical fiber comprising at least one at least partially crosslinked polysilazane coating composition in which no organic electrophile has been reacted, contacting at least a portion of an optical fiber.

21. The coated optical fiber of claim 20, wherein said at least one at least partially crosslinked polysilazane coating composition further comprises at least one filler material selected from the group consisting of carbon, metal, ceramic, inorganic polymeric material, and organic polymeric material.

22. The coated optical fiber of claim 20, wherein said at least one at least partially crosslinked polysilazane coating composition is substantially completely crosslinked, and further comprises at least one additional coating composition.

23. The coated optical fiber of claim 22, wherein said at least one additional coating composition comprises an organic polymer composition.

* * * * *